Oct. 11, 1938.  O. G. WELLTON  2,132,911
SPEED RATIO INDICATOR
Filed Oct. 3, 1935  2 Sheets-Sheet 1

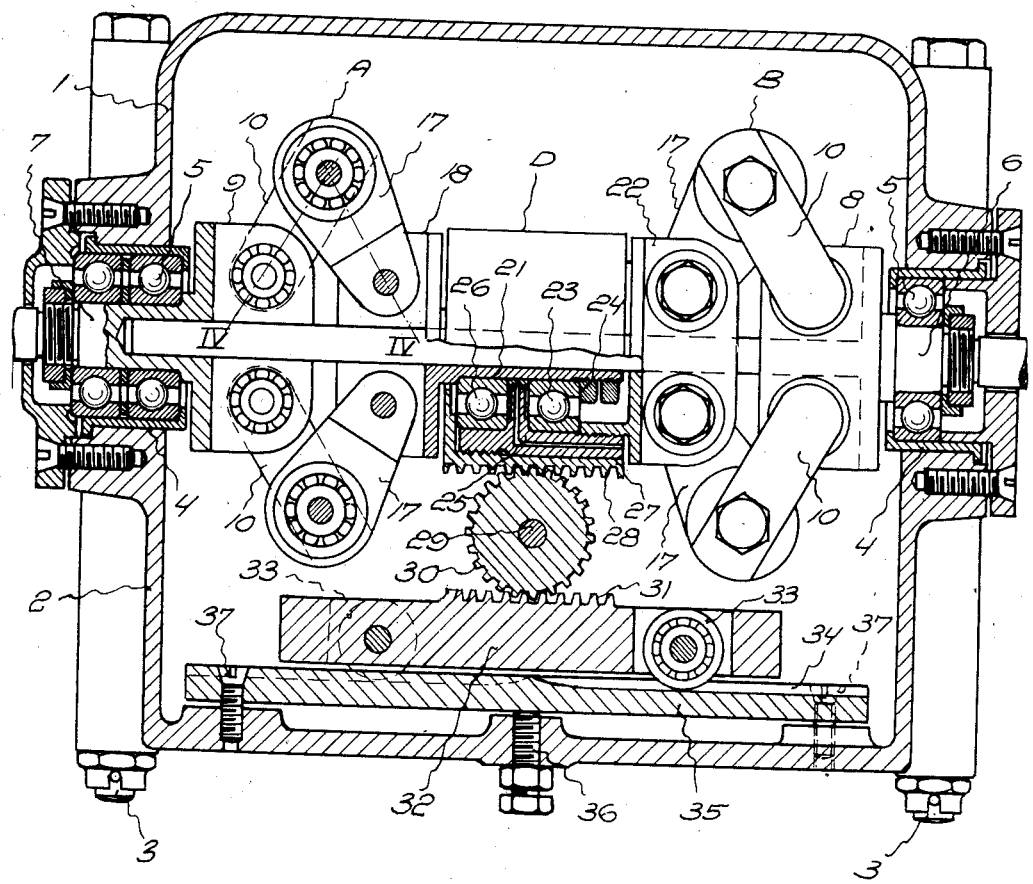
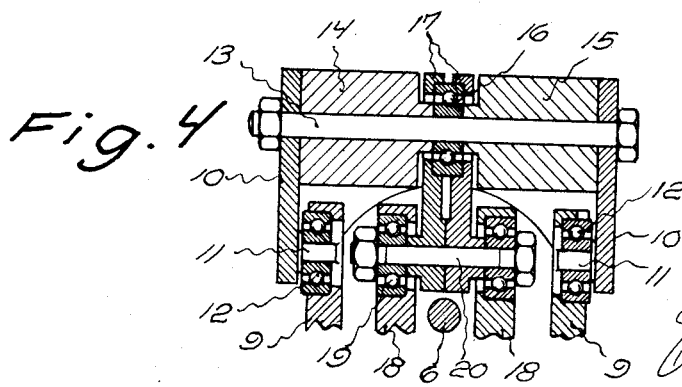

Patented Oct. 11, 1938

2,132,911

UNITED STATES PATENT OFFICE 2,132,911

SPEED RATIO INDICATOR

Otto Gottfried Wellton, Rasunda, Sweden

Application October 3, 1935, Serial No. 43,435
In Sweden February 9, 1935

6 Claims. (Cl. 235—103.5)

The present invention relates to a speed ratio indicator for exact indication of the ratio between angular speeds, such as the speeds of two rotating shafts, or between linear speeds after conversion of the same into angular speeds. The invention is based upon the conception that two mechanically counteracting centrifugal governors will assume a configuration which is dependent solely upon the ratio between their angular speeds.

The new device may be used in all cases where is is desired to indicate speed ratios, or synchronism, between rotating parts and is particularly intended for use in connection with gear boxes on motor vehicles and the like for indicating synchronism between two toothed wheels to be brought into engagement with each other. Furthermore the new device may be used to initiate coupling or other regulating actions at certain speed ratios. The speed ratio indicator may be constructed so as to be completely insusceptible to shocks occurring on a motor vehicle or the like on which the indicator is mounted.

The invention is illustrated in the accompanying drawings, wherein—

Figure 1:
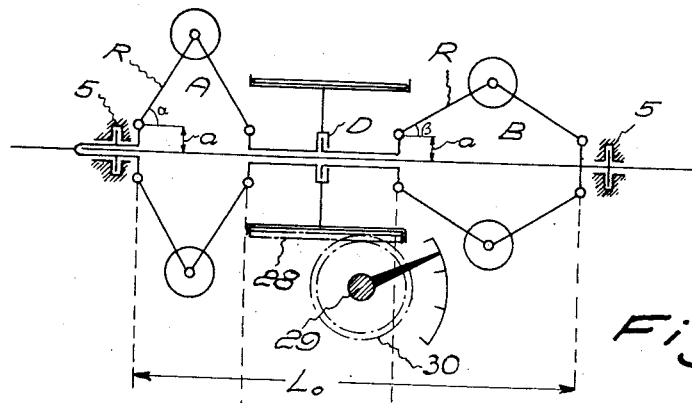
Figure 2:
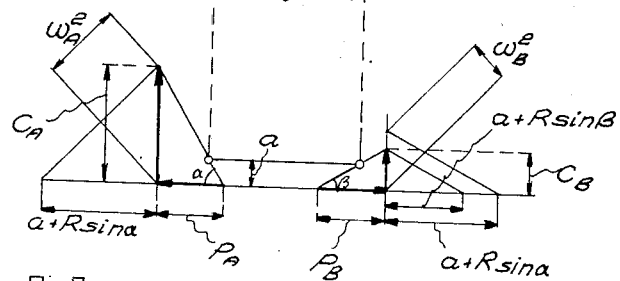
Figure 2:
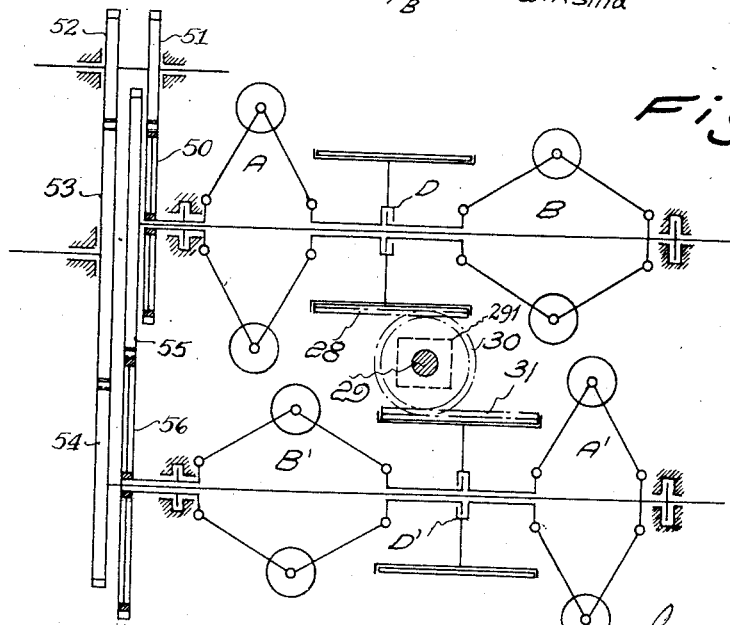

Fig. 1 is a diagrammatical view of a first embodiment of the invention. Fig. 2 is a diagrammatical view of a second embodiment including means for eliminating the effect of shocks. Fig. 3 is a longitudinal section of a third embodiment. Fig. 4 is a cross-sectional view taken through IV—IV of Fig. 3.

In Fig. 1 A and B designate two pendulum governors the adjacent movable ends of which are rotatably interconnected by means of a member D so that the governors are free to be rotated at different angular speeds. The intermediate member D may consist simply of two engaging parts one of which is connected to, or integral with, the governor A, and the other of which is connected to, or integral with, the governor B. The outer ends of the two governors A and B are fixed in bearings 5 so as to keep the distance $L_0$ between said outer ends constant. The use of the device as a speed ratio indicator is possible due to the fact that the configuration of the two governors and hence the position of the intermediate member D is dependent solely upon the ratio between the angular speeds of the governors A and B. As long as this ratio is constant, the absolute values of the angular speeds may be increased, or decreased, at will without affecting the position of the member D.

This may be mathematically demonstrated.

Assume for the sake of simplicity that the two governors A and B are identical, the angular speeds of the same being $\omega_A$ and $\omega_B$, respectively, the length of each of the pendulum arms (the weights of which are neglected) being R, the angles between the pendulum arms and the governor axes being $\alpha$ and $\beta$, respectively, the mass of each fly-weight being $m$, the difference between $L_0$ and the length $d$ of the intermediate member D being L, and the perpendicular distance from the bearing points of the pendulum arms to the governor axes being $a$.

Then $$\cos \alpha + \cos \beta = \frac{L}{2R} \quad (1)$$

The centrifugal forces acting on the fly-weights are $$C_A = m\omega_A^2(a + R \sin \alpha)$$
$$C_B = m\omega_B^2(a + R \sin \beta) \quad (2)$$

The opposing axial forces acting on the member D are $$P_A = C_A \cot \alpha$$
$$P_B = C_B \cot \beta \quad (3)$$

In equilibrium $P_A = P_B$, thus $$C_A \cot \alpha = C_B \cot \beta \quad (4)$$

Equation (4) together with Equation (2) gives $$\frac{(a + R \sin \alpha) \cot \alpha}{(a + R \sin \beta) \cot \beta} = \frac{\omega_B^2}{\omega_A^2} \quad (5)$$

In Equation (5) $\beta$ may be expressed in terms of $\alpha$ or vice versa, by the aid of Equation (1). It is apparent, therefore, that the angles $\alpha$ and $\beta$ and consequently the position of the member D are dependent solely upon the ratio between the angular speeds of the governors.

In the practical embodiment the intermediate member D is caused to actuate an indicator, such as a pointer coacting with a dial. To this end a sleeve carrying a rack bar 28 may be rotatably mounted on the intermediate member D, the rack bar engaging a pinion 30 on a shaft 29 to which the pointer is secured.

On a motor vehicle provided with a gear box the governor A, for instance, is coupled to the motor shaft and the governor B to the propeller shaft through suitable transmissions, such as toothed gearings. When it is desired to change over from one speed ratio to another, the gear of the first mentioned speed ratio is thrown out without disengaging the clutch between the engine and the gear box. The speed of the engine is then decreased, or increased, as the case require, relatively to that of the propeller shaft. As the speed ratio between the motor shaft and the propeller shaft is changed, the intermediate member D is moved axially and actuates the pointer which moves over the dial. The dial is provided with marks corresponding to the different speed ratio of the gear box. When the pointer is in alignment with one such mark, the toothed wheels of the corresponding speed ratio are in synchronism with each other, and at this moment the said wheels are brought into mesh by means of the control lever. It is apparent that by proceeding in this way not only the toothed wheels of the change speed gear box but also the engine has acquired the right speed for said speed ratio, thus not having to slip on the friction clutch in order to acquire the right speed. This is a very important result which is not obtained by means of the synchronizing devices hitherto known.

The above described mechanism may be of very small size and may be placed in a casing which is secured to the gear box. If desired, it may also be built into the latter. The mechanism is insusceptible to shocks occurring in a plane perpendicular to the governor axes as the fly-weights of the governors A and B in case of such shocks will exert equal and opposing forces upon the intermediate member D. In order to eliminate the effect of axial shocks the mechanism may be doubled, as shown in Fig. 2, i. e., an identical pair of governors A', B' having an intermediate member D' and a rack bar 31 may be arranged to actuate the pinion 30 at a point diametrically opposite to that of the rack bar 28. The governor A is keyed to gear 50 meshing with gear 51 which is keyed to an equal gear 52. Gear 52 meshes with the driving gear 53 which also meshes with gear 54. The latter gear is equal to gear 50 and keyed to governor A'. Governor B is keyed to gear 55 meshing with the equal gear 56 which is keyed to governor B'. Thus the governors A and A', B and B' will rotate at the same speeds.

The bearings 5 for the outer ends of the governors, or one of said bearings, may be adjustable in axial direction so that the distance $L_0$ and the configuration of the governors may be changed.

Calculations and practical trials have shown that the governors A', B' for eliminating the effect of axial shocks may be replaced by a simple counterweight with the same effect. In this way a simpler and more compact construction is arrived at. An embodiment of this kind is shown in Figs. 3 and 4.

The mechanism is contained in a casing comprising an upper part 1 and a lower part 2 connected together by means of bolts 3. In the side walls of the casing bores are provided for the ball bearings 5 of the governor spindles 6 and 7. The spindle 6 of the governor B extends through the casing and has its end rotatably mounted in a bore in the spindle of the governor A. Adjacent to the side walls each governor spindle carries a forked member 8 and 9, respectively, to which the outer pendulum arms 10 of the governor are pivoted. As will be seen from Fig. 4, each fly-weight has two outer arms 10 extending outside the shanks of the forked member 9 and pivoted to the same by means of pins 11 resting in ball bearings 12. The other ends of the arms 10 are connected together by means of a bolt 13 carrying the fly-weight which consists of two parts 14 and 15. Between the parts 14 and 15 a ball bearing 16 is placed on the bolt 13, and on this ball bearing one end of the inner bipartite pendulum arm 17 is pivotally mounted.

The other end of the pendulum arm 17 extends between the shanks of a forked member 18 and is pivoted to the same by means of ball bearings 19 and a bolt 20. The arm structure is held together by means of nuts on the ends of the bolts 13 and 20.

The member 18 has a sleeve-like extension 21 which is rotatably mounted directly on the spindle 6. The inner pendulum arm of the second governor B is pivoted to a forked member 22 similar to the member 18. This forked member 22 is rotatably connected to the sleeve 21 by means of a ball bearing 23 the inner ball race of which abuts against a nut 24 on the sleeve 21 while the outer ball race abuts against a member 25 threaded on the part 22. An outer sleeve 27 is rotatably mounted on the extension 21 by means of a ball bearing 26 and carries a rack bar 28 meshing with the pinion 30 on the shaft 29.

At a point of the pinion 30 diametrically opposite to that of the rack bar 28 another rack bar 31 engages the pinion, said last mentioned rack bar being carried by the counter-weight for eliminating the effect of axial shocks. The counter weight is in the form of a block 32 having wheels 33 which roll in grooves 34 in a supporting plate 35. In the embodiment shown the counter weight has three triangularly arranged wheels 33 of which only two are visible, the tires of said wheels consisting of the outer races of ball bearings. Approximately at the center the plate 35 is supported by a bolt 36 passing through a threaded hole in the bottom of the casing. By means of this bolt the plate 35 may be forced against the heads of three screws 37 passing through holes adjacent to the edge of the plate and threaded into holes in the bottom of the casing. By manipulating the screws 37 and the bolt 36, the plate 35 can easily be adjusted to the correct position.

The block 32 is intended to balance the effect of axial shocks on the governors A and B. In order to do this its weight should be such that the governors A and B on the one hand and the block 32 on the other hand are in equilibrium when the mechanism is placed with the governor spindles in vertical position.

As will be understood particularly from Fig. 4, the arrangement of the pendulum arms 10, 17 and the members 8, 9, 18, 22 is such as to permit complete or substantially complete compression of each governor so that the inner and outer pendulum arms of the same will be more or less in alignment with each other. This enables the best utilization of the configuration possibilities of the governors. If the device is to be used for indicating the speed ratio between two rotating shafts, for instance, it is suitable to drive the governor spindles from said shafts by means of such transmissions that the configuration of the governors at the lowest speed ratio to be indicated is the image of their configuration at the highest speed ratio to be indicated. To obtain this result when the device is used on a motor vehicle and one governor is driven from the propeller shaft with the speed ratio 1:1, the other governor should be driven from the motor shaft by means of a transmission giving said other governor the speed $$\sqrt{n.n_0},$$

where $n$ is the number of revolutions of the propeller shaft at the first speed ratio of the gear box and $n_0$ is the corresponding number of revolutions of the engine.

In the above described embodiments the governors are arranged so as to exert a pulling action on the intermediate member D. It is apparent, however, that the same result will be obtained if they were adapted to exert a pushing action on said member, as for instance by the aid of a lever system of some kind. The construction of the device apparently may be changed in various ways without departing from the spirit of the invention.

As the above described device is intended for exact indication of speed ratios the load on the same should be the smallest possible. When used for regulating purposes it should be arranged to actuate a relay or a servomotor which affords practically no resistance to the rotation of shaft 29 and which performs the desired regulating actions. Thus shaft 29 may be arranged to actuate a magnetic or photoelectric device for closing an electric circuit or to actuate a valve means for a pressure medium.

In the following claims the term "indicating means" is intended to cover not only pointers and the like but also relays affording practically no resistance to the rotation of the shaft 29.

Having now particularly described and ascertained the nature of my invention, and in what manner the same is to be performed, I declare that what I claim is:

1. In a speed ratio indicator, two centrifugal governors each of which is free to be rotated at any desired angular velocity, an intermediate member adapted to be mechanically actuated by one of said governors in the one direction and by the other of said governors in the opposite direction whereby the configuration of one governor positively determines the configuration of the other governor, and an indicating means adapted to be moved by said intermediate member in accordance with the changes in the configuration of said governors.

2. In a speed ratio indicator, two centrifugal governors each of which is free to be rotated at any desired angular velocity, an intermediate member adapted to be mechanically actuated by one of said governors in the one direction and by the other of said governors in the opsite direction whereby the configuration of one governor positively determines the configuration of the other governor, a rack member carried by said intermediate member, a shaft, a pinion secured to said shaft and adapted to engage said rack member, and an indicating means secured to said shaft.

3. In a speed ratio indicator, two coaxially arranged centrifugal governors each having a relatively fixed end and a movable end, an intermediate member for mechanically and rotatably interconnecting the movable ends of said governors whereby the configuration of one governor positively determines the configuration of the other governor, a rack member rotatably mounted on said intermediate member, a shaft, a pinion on said shaft and adapted to engage said rack member, and an indicating means secured to said shaft.

4. In a speed ratio indicator, two centrifugal governors each of which is free to be rotated at any desired angular velocity, an intermediate member adapted to be mechanically actuated by one of said governors in the one direction and by the other of said governors in the opposite direction whereby the configuration of one governor positively determines the configuration of the other governor, an indicating means adapted to be moved by said intermediate member in accordance with the changes in the configuration of said governors, and a counter-weight for eliminating the effect on said indicating means caused by an axial shock on said governors.

5. In a speed ratio indicator, two centrifugal governors each of which is free to be rotated at any desired angular velocity, an intermediate member adapted to be mechanically actuated by one of said governors in the one direction and by the other of said governors in the opposite direction whereby the configuration of one governor positively determines the configuration of the other governor, a rack member rotatably mounted on said intermediate member, a shaft, a pinion secured to said shaft and adapted to engage said rack member, an indicating means secured to said shaft, a counter-weight provided with wheels, a rack member on said counter-weight adapted to engage said pinion at a point diametrically opposite to that of said first mentioned rack member, and an adjustable supporting means for said counter-weight.

6. In a speed ratio indicator, two centrifugal governors each of which is free to be rotated at any desired angular velocity, said governors being adapted positively to influence each other so that the configuration of one of them positively determines the configuration of the other, and an indicating means adapted to be actuated by said governors and to be set in accordance with their configuration.

OTTO GOTTFRIED WELLTON.